United States Patent [19]

Mitchell, Jr.

[11] Patent Number: 5,362,427
[45] Date of Patent: Nov. 8, 1994

[54] METHOD AND APPARATUS FOR MANUFACTURING AN ARTICLE USING A SUPPORT STRUCTURE FOR SUPPORTING AN ARTICLE DURING MANUFACTURE THEREFOR

[76] Inventor: Porter H. Mitchell, Jr., 80B Cunningham Hollow, Fayetteville, Tenn. 37334

[21] Appl. No.: 58,124

[22] Filed: May 10, 1993

[51] Int. Cl.$^5$ ............................................. B29C 67/00
[52] U.S. Cl. .................................... 264/22; 264/109; 264/308; 425/174; 425/447; 425/449
[58] Field of Search ................... 264/6, 22, 109, 308; 425/174, 447, 449

[56] References Cited

U.S. PATENT DOCUMENTS

| | | | |
|---|---|---|---|
| 4,665,492 | 5/1987 | Masters | 364/468 |
| 5,134,569 | 7/1992 | Masters | 364/474.24 |
| 5,136,515 | 8/1992 | Helinski | 264/308 |
| 5,216,616 | 6/1993 | Masters | 264/308 |
| 5,257,657 | 11/1993 | Gore | 264/308 |

OTHER PUBLICATIONS

"3D Protoypes Shot From a Nozzle" Machine Design Jun. 21, 1990, p. 82.
"Rapid Prototyping Shapes Up as Low-Cost Modeling Alternative" Modern Plastics, Aug. 1990 pp. 40, 41, 43.

*Primary Examiner*—Mary Lynn Theisen
*Attorney, Agent, or Firm*—John C. Garvin, Jr.; Harold W. Hilton

[57] ABSTRACT

Apparatus and method for supporting at least a portion of an article while the article is being formed. A source of self-adhering particles is directed by a particle jetting device, or the like, to a predetermined position in a controlled environment to form the article. A support structure is carried in the controlled environment for substantially rigidly supporting at least a portion of the article during the formation of the article (by build-up of the self-adhering particles). The support structure is a fluid which changes state to a solid responsive to an electrical charge and reverts back to a fluid responsive to removal of the electrical charge.

14 Claims, 1 Drawing Sheet

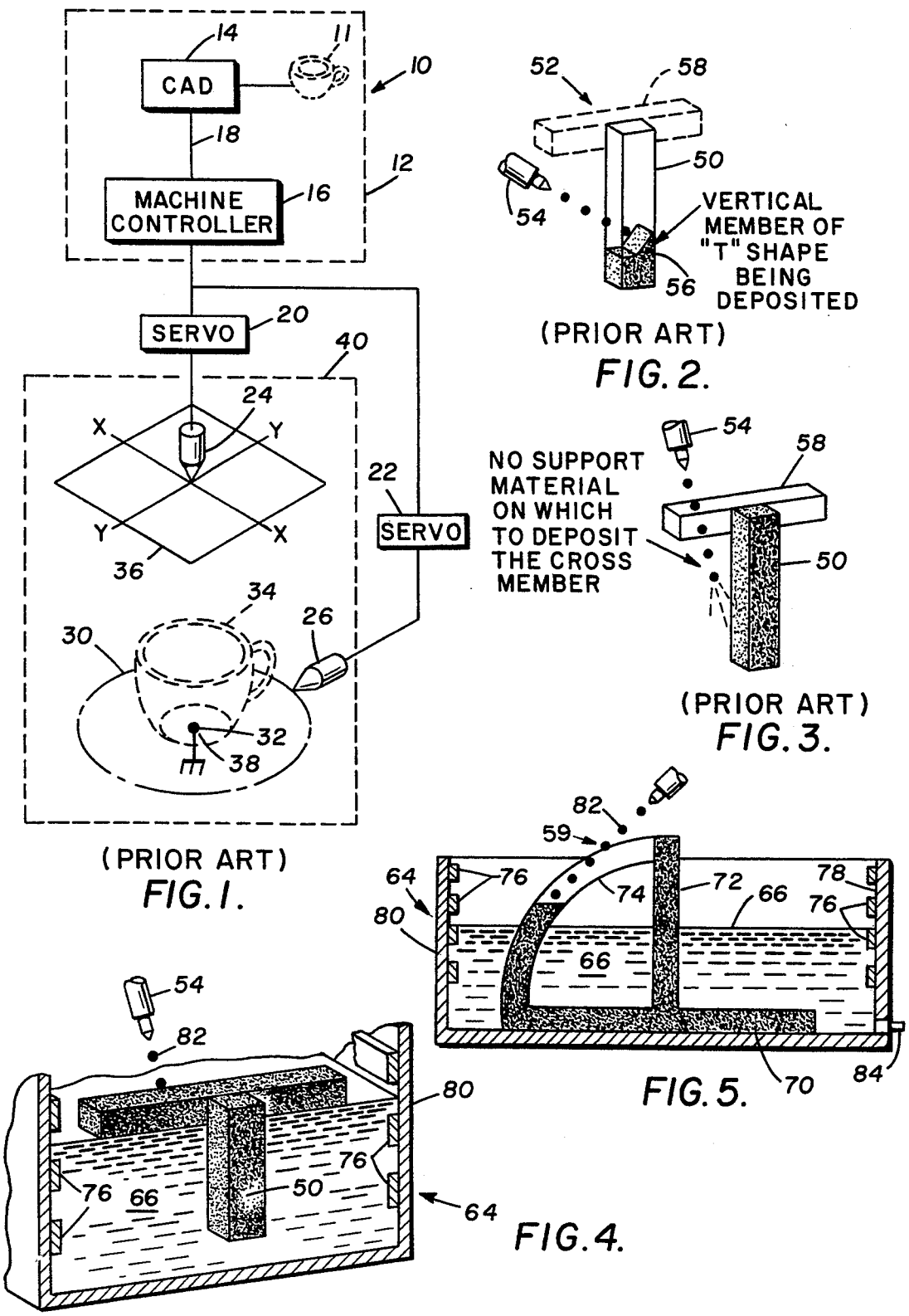

METHOD AND APPARATUS FOR MANUFACTURING AN ARTICLE USING A SUPPORT STRUCTURE FOR SUPPORTING AN ARTICLE DURING MANUFACTURE THEREFOR

FIELD OF THE INVENTION

The invention relates to the automatic manufacturing of articles by use of computer aided design and control and more particularly to such a manufacturing process and apparatus which is operable in conjunction with a support structure for the article being manufactured, the support structure being formed by electrotheological fluids.

BACKGROUND OF THE INVENTION

The present invention utilizes the principles of Particle Jetting Technology (PJT), computer aided design (CAD), and Electrorheological Fluid (ER) technology to manufacture an article to a predetermined configuration.

The PJT process involves using computer controlled independently targeted particles to construct three dimensional structures whereas, traditionally, a physical article was manually constructed by individuals working from drawings of a 3D image. In the PJT process, particles are deposited onto a substrate in much the same manner that an ink jet printer produces two dimensional images. A structure would be produced by printing multiple cross sections with cold welding or rapid solidification providing cohesion between particles. This manufacturing system can automatically produce parts in a single step which would require multiple manufacturing stages using conventional techniques.

In one embodiment of the PJT principle, an ink jet mechanism (well known in that art) ejects a molten wax through a small orifice as a result of an impulse from a piezoelectric ceramic device. The ink jet mechanism is positioned by a three axis robot using conventional (CAD) software. The melt temperature of the wax and the distance from the ink jet orifice to the substrate may be adjusted such that cold welding or rapid solidification provides cohesion between the particle and the substrate. An ink jet mechanism was preferred for this embodiment because of its ability to control the production of individual particles, and because it provides sufficient initial velocity to eliminate the need for subsequent acceleration and the wax is a safe and versatile material.

The PJT process is adaptable to many curable or solidifiable materials such as waxes, UV curable polymers, thermoplastic materials, thermosetting materials, ceramics and metals. Of all the usable material, metals contain the most potential for industrial applications. PJT with metals enables the user to produce extremely dense, microcrystalline structures with plasma deposition.

One example of particle jetting technology is disclosed in an article entitled "3D Prototypes Shot From A Nozzle" in the Jun. 21, 1990 issue of *Machine Digest*.

An additional example of particle jetting technology is disclosed in an article entitled "Rapid Prototyping Shapes Up As A Low Cost Modeling Alternative" in the August 1990 issue of Modern Plastics.

Computer aided design (CAD) systems are known and allows an operator to operate a computer to design a three dimensional object and display the design on a screen or on paper.

It has also been known to control a mechanical operation or manufacturing process by a computer such as in robotics. For example, as set forth in U.S. Pat. No. 4,665,492 (column 1, lines 27–31) the milling of metal parts to produce a simple article by means of a computer aided milling machine has been widely applied. One such computer aided milling machine is that manufactured by the Cincinnati Milicros Company.

Electrorheological fluid technology is also known. Such fluids are suspensories of fine polarizable particles in a dielectric medium, typically oils. The particles can be polymers, ceramics, silicon or other materials as long as the particles meet specific or semiconductive properties. The ER fluids solidify as fast as 0.001 sec. to 0.0001 sec. when placed in an electric field and liquify completely once the electric field is removed. These materials have to date been used principally in the automotive industry as variable drive transmissions, variable hydraulic shock absorbers, and as rotational seals in high speed, high vacuum drivers.

In using the CAD software, as set forth in U.S. Pat. Nos. 4,665,492, and 5,134,569 issued respectively on May 12, 1987 and Jul. 28, 1992 to William E. Masters, (both incorporated herein by reference), a three dimensional object is described. The software then takes the completed object, and sections it into discrete layers having a predetermined thickness which is approximately equal to the size of the material droplets ejected from an ejection head of a particle jetting apparatus. The software then directs the robotic drive to position the ejection head at the coordinates where the first drop of material, for the first layer of the object (article) is to be deposited.

Once the computer has directed the robotic positioner to the correct X, Y coordinates, an ink-jet printer deposits the first drop of material and the robotic drive then proceeds to next set of coordinates and deposits another drop of material. This movement-deposition process continues until the first layer of the structure is completed. The computer then begins the deposition process for the next layer of the structure. Each layer is sequentially deposited on the previous layer until the 3D object is completed.

The problem with PJT occurs when trying to build an overhang structure. An overhang is that part of the structure that is attached to, rather that built upon, an underlying part of the structure. As an example, consider the PJT fabrication of a simple "T"-structure. The vertical member of the T is easily fabricated, depositing one layer of the structure sequentially upon the previous layer. However, the horizontal cross-member of the "T" requires a support structure upon which the particles must be deposited and unfortunately, during the PJT process, described supra, the particles would adhere to the support structure.

Ideally, what is desired is a support material that would act as a surrogate surface during the deposition of an overhand structure, or the like, that could easily be removed when the article was completed. Because of their ability to rapidly change from a fluid to a solid and then back to a fluid, electrorheological fluids are suitable as support materials.

Prior to the present invention, the state of the art of support materials relied on differences in intrinsic properties such as melting point or physical properties such as solubility between the build and support material.

Typically, a wax with a lower melting point than the build material would be used. The support wax would be deposited in a similar manner as the build material. Then once the part was completed, it would be heated to remove the support material. In the case of different polymers, the part would be placed into a solvent that preferentially dissolved the support material.

The obvious disadvantages to this process are that the melting of the support material would be incomplete for that the build material would soften during the heat cycle. The same would be true with the dissolution process. The solvent would leave traces of material on the part, and possibly soften the build material. The use of electrorheological fluids overcomes these advantages and by changing its viscosity it can serve as a support material that is cheap, easy to handle. The material will lend support as long as an electric field is applied, and is removed by simply removing the electric field. Furthermore, when the ER support material is in a fluid state, it is easily pumped into and out of the building chamber. A further advantage of using ER material as support material is that it can be deposited from the ink jet and if a structure requires fabrication of a complex overhang, the ER fluid can be deposited from the ink-jet printer head into small spatial areas. Thus the size of the support structure is easily tailored.

Electrorheological fluid technology is disclosed in the following U.S. Pat. Nos.: 4,033,892, issued Jul. 5, 1977; 4,687,589, issued Aug. 18, 1987; 4,744,914, issued May 17, 1988; 2,417,850 issued Mar. 25, 1947; 2,661,596, issued Dec. 8, 1953; 3,047,507, issued Jul. 31, 1962; 3,970,573 issued Jul. 20, 1976; 3,984,449, issued Oct. 5, 1976; 4,033,892, issued Jul. 5, 1977; 4,129,513, issued Dec. 12, 1978; 4,687,589, issued Aug. 18, 1987; and 4,733,914, issued May 17, 1988.

It is therefore an object of the present invention to provide a process and apparatus for producing a three-dimensional object automatically in response to the computer aided design of the object wherein the object, or portion thereof, is built up on a support structure formed of a material capable of changing state.

It is a further object of the present invention to form such support structure of electrorheological fluids.

BRIEF DESCRIPTION OF THE DRAWINGS

FIG. 1 is a schematic illustration of a typical (prior art) apparatus for producing a design of a three dimensional article and the automatic reproduction of the article in three-dimensional physical form.

FIG. 2 is diagrammatic prior art illustration of an ink-jet apparatus forming the vertical column of a "T" shaped structure.

FIG. 3 is a view similar to FIG. 2 illustrating an ink-jet apparatus attempting to form the top (cross-member) of the "T" shaped structure of FIG. 2 when a support structure for the top cross-member is not provided.

FIG. 4 is a diagrammatic illustration of the "T" structure of FIG. 3 but illustrates the top member of the "T" structure being supported on a solidified electrotheological fluid. Electrodes are shown on a housing and in contact with the support structure to change the state of the support structure.

FIG. 5 is a diagrammatic view of a build chamber in accordance with the principles of the present invention. The chamber is shown to house an object of manufacture having an arched upper structure. Electrodes are positioned on the sides of the chamber and are disposed in the electrorheological fluid.

DESCRIPTION OF THE PREFERRED EMBODIMENTS

FIGS. 1–3 are views illustrating prior art devices and systems which are used in carrying out the principles of the present invention. FIG. 1 illustrates a direct CAD system 10 as disclosed in U.S. Pat. No. 4,665,492 forming a cup 11 in accordance with the teachings of the patent. The prior art apparatus of FIG. 1 is disposed for automatically manufacturing an article in three dimensions by aid of a computer machine which designed the article. As seen in FIG. 1, a computer system 12 includes a computer aided design computer 14 and a machine controller 16 which receives a file of coordinate information 18. An article is designed by the computer aided design unit 14 and a data file of three-dimensional coordinates are compiled. The coordinate information is input to the machine controller 16 which controls a pair of servos 20 and 22 in a polar coordinate system and further control the position of a first working head 24 movable in an X-Y coordinate plane 36, and a second working head 26 movable in a polar plane (indicated by the numeral 30), so that mass particles may be injected to arrive at predetermined coordinate points in the polar coordinate system to form an article 34. A controlled environment 40 is provided for enclosing the article 34 during formation thereof. In the structure of FIG. 1, an origination seed 32 is fixed at any suitable structure 38 at an origin of the coordinate system and the article 34 is built up around the original seed.

FIG. 2 illustrates an example of PJT fabrication wherein a "T" structure is to be formed. As can be seen in FIG. 2, the vertical member 50 of the "T" structure 52 is easily fabricated, since the ink-jet nozzle 54 merely deposits one layer of structure sequentially upon a previously formed layer identified by the numeral 56; however, when the ink-jet begins to form the cross member 58, the particles fall on empty spaces (FIG. 3) as there is no underlying material on which to deposit the first layer.

In order to complete the fabrication of the overhanging cross member 58 (FIG. 4) or other overhanging structure such as the arched structure 59 as shown in FIG. 5, a support material must be put in place so that the particles of material being ejected from the injection head ink-jet have a foundation to build upon. The support structure should be such that it lends rigid support during fabrication of the article and then is easily removable. A support structure made of material which possesses the ability to change its phase is an ideal support structure, and the phase-change material utilized in carrying out the principles of the present invention is electrorheological fluids.

As can be seen in FIGS. 4 and 5, a controlled environment is provided by a housing 64 enclosing a rheological fluid 66. The article of manufacture 59 of FIG. 5 is shown to have a horizontal bottom portion 70, a vertical portion 72 and a curved upper section 74. The housing 64 is shown to have a plurality of electrodes 76 mounted on the interior surface 78 of the walls 80 which form the sides of the housing. The electrodes may be independently addressable. The spatial distance between the strips determines the thickness of the ER fluid that can be controlled during fabrication of a curved overhang. As can be seen in FIGS. 4 and 5, the rheological fluid 66 is shown as a fluid. However, it is to be understood that the ER fluid is substantially solidified by application of an electrical charge to the fluid whereby the solidified material supports the particles 82 ejected by the ink-jet 54 to thereby provide a support structure for the article during the manufacturing thereof. The solid supports reverts back to its fluidic state responsive to the removal of the electrical charge on electrodes 76. The housing may be provided with a drain 84 to drain the fluid, if desired.

While the above description constitutes preferred embodiments of the present invention, it will be appreciated that the invention is susceptible to modification, variation and change without departing from the proper scope and fair meaning of the accompanying claims.

I claim:

1. A method for designing an article in two dimension and then reproducing the article in three dimensions wherein said article requires a support means for support of at least a portion thereof during the reproduction, said method comprising the steps of:

generating a data file of three dimensions on a computer machine representing the three dimensional design of said article in a coordinate system;

providing a controlled environment;

providing a source of mass particles;

directing said particles to the three-dimensional coordinates of said article of said coordinate system;

joining said particles to one other at said coordinates beginning at a predetermined point of origin of said article in said coordinate system;

providing a support material for supporting engagement with at least a portion of said article during the reproduction thereof in three dimensions, said support disposed for withdrawal from said supporting engagement with said article responsive to change of state of said support material subsequent to formation of said article, said change of state being accomplished by application of an electrical stimulus to said support material to change said material from a first phase to a second phase and removing said electrical stimulus to change said state from said second phase back to said first phase.

2. A method as in claim 1 wherein said material is an electrorheological fluid.

3. Apparatus for reproducing a physical three-dimensional article from a data file generated on a computer machine on which said article was designed comprising:

a data file of three-dimensional coordinate information which corresponds to the design of said article in a three-dimensional coordinate system and space;

a controlled environment;

a source of mass particles;

directional means for directing said mass particles to said coordinates in said coordinates within said controlled environment;

directional control means for controlling said directional means in response to said coordinate information in said data file;

means for joining said mass particles together at said coordinates to physically construct said article according to the information provided by said data file;

support material means carried in said controlled environment for engaged, supporting relation with at least a portion of said article during the physical construction thereof; and environment control means for controlling the environment of said controlled environment to effect physical and chemical changes in said support means to cause said support means to withdraw from said engaged, supporting relation with said article subsequent to formation thereof by changing the state of said support material means from a fluid state to a substantially solid state and back to said fluid state.

4. Apparatus as in claim 3 wherein said controlled environment is defined by a housing for enclosing and supporting said article therein.

5. Apparatus as set forth in claim 4 wherein said housing is disposed for support of said environmental control means thereon.

6. Apparatus as set forth in claim 4 wherein said support means is an electrotheological fluid.

7. Apparatus as set forth in claim 6 wherein said environmental control means is carried in said housing in contact with said electrorheological fluid.

8. Apparatus as in claim 7 wherein said environmental control means is defined by electrode means disposed for energization to apply an electrical charge to said electrorheological fluid for said electrorheological fluid from a liquid state to a substantially solid state and for changing said electrorheological fluid back to a liquid state responsive to deenergization of said electrode means.

9. Apparatus including a support means for support of at least a portion of an article formed by depositing self-adhering particles upon each other in successive layers, said apparatus comprising:

a source of self-adhering particles;

particle injection means for directing said particles to a predetermined position in a controlled environment, said particles being joined together at said predetermined position responsive to injection thereof by said particle injection means to form an article of manufacture; and support means disposed in said controlled environment for support of said particles during the build up of said particles while forming said article, said support means disposed for changing from a liquid state to a substantially solid state for substantially rigid support of article during said formation thereof, said support means disposed for changing from said solid state back to said liquid state subsequent to formation of said article, whereby said support means is withdrawn from the rigid supporting engagement with said article.

10. Apparatus as in claim 9 herein said controlled environment is defined by a housing for enclosing and supporting said article and said support means therein.

11. Apparatus set forth in claim 10 wherein said housing is disposed for support of said environmental control means thereon.

12. Apparatus as set forth in claim 11 wherein said support means is an electrorheological field.

13. Apparatus as set forth in claim 12 wherein said environmental control means is carried in said housing in contact with said electrorheological fluid.

14. Apparatus as in claim 13 wherein said environmental control means is defined by electrode means disposed for energization for applying an electrical charge to said electrorheological fluid support means for changing the state thereof from a liquid to a substantially solid state and for changing said support means back to a liquid responsive to deenergization of said electrode means.

* * * * *